(12) United States Patent
Burkart et al.

(10) Patent No.: US 12,339,158 B2
(45) Date of Patent: Jun. 24, 2025

(54) MODULAR METROLOGICAL DEVICE, IN PARTICULAR FOR A MULTI-TRACK WEIGHING MACHINE

(71) Applicant: Wipotec GmbH, Kaiserslautern (DE)

(72) Inventors: Ralf Burkart, Börrstadt (DE); Jan Gottfriedsen, Waldfischbach-Burgalben (DE); Alexander Schulzki, Stelzenberg (DE)

(73) Assignee: Wipotec GmbH, Kaiserslautern (DE)

( * ) Notice: Subject to any disclaimer, the term of this patent is extended or adjusted under 35 U.S.C. 154(b) by 432 days.

(21) Appl. No.: 17/981,130

(22) Filed: Nov. 4, 2022

(65) Prior Publication Data

US 2023/0184580 A1     Jun. 15, 2023

Related U.S. Application Data

(63) Continuation of application No. PCT/DE2021/100391, filed on Apr. 29, 2021.

(30) Foreign Application Priority Data

May 7, 2020 (DE) .......................... 102020112420.1

(51) Int. Cl.
*G01G 21/28* (2006.01)
(52) U.S. Cl.
CPC .................... *G01G 21/28* (2013.01)
(58) Field of Classification Search
USPC ........................................................ 177/239
See application file for complete search history.

(56) References Cited

U.S. PATENT DOCUMENTS

| 4,738,632 A | 4/1988 | Schmidt |
| 5,629,831 A * | 5/1997 | Eggert ................ H05K 7/1472 |
| | | 361/728 |
| 6,147,877 A | 11/2000 | Strandberg |
| | (Continued) | |

FOREIGN PATENT DOCUMENTS

| DE | 3603750 A1 | 8/1987 |
| DE | 102009060234 A1 | 6/2011 |
| | (Continued) | |

OTHER PUBLICATIONS

Office Action issued Dec. 1, 2023, in Japanese patent application 2022-564817.

*Primary Examiner* — Jacques M Saint Surin
(74) *Attorney, Agent, or Firm* — Calvert Technology Law, PLLC; Nathan H. Calvert

(57) ABSTRACT

A modular weighing device includes a basic base module and a plurality of extension modules mechanically and electrically connected to the basic base module in a disconnectable manner. Each extension module includes an add-on base module and a connection module. The extension modules are arranged adjacent to one another and are each mechanically and electrically connected to one another in a disconnectable manner to form a stack of extension modules and the basic base module is electrically and mechanically connected to one of the outer extension modules of the stack in a disconnectable manner. The connection modules can comprise electronic evaluation and/or control units for weighing components or can comprise weighing cells.

19 Claims, 4 Drawing Sheets

(56) References Cited

U.S. PATENT DOCUMENTS

| | | | |
|---|---|---|---|
| 7,330,766 B2 | 2/2008 | Kuwayama | |
| 7,339,122 B2 * | 3/2008 | Burkhard | G01G 21/244 |
| | | | 177/229 |
| 7,677,113 B2 * | 3/2010 | Laubstein | G01G 21/22 |
| | | | 73/862.046 |
| 9,351,060 B2 * | 5/2016 | Wilker | G10L 15/22 |
| 2001/0034671 A1 | 10/2001 | Luke | |
| 2009/0082996 A1 | 3/2009 | Uster | |
| 2017/0097256 A1 | 4/2017 | Scheu | |

FOREIGN PATENT DOCUMENTS

| | | |
|---|---|---|
| DE | 202016007965 U1 | 4/2017 |
| JP | H997658 A | 4/1997 |
| JP | 2001196127 A | 7/2001 |
| JP | 2002039845 A | 2/2002 |
| JP | 2002330514 A | 11/2002 |
| JP | 2006156257 A | 6/2006 |
| JP | 2008542730 A | 11/2008 |
| JP | 200980810 A | 4/2009 |
| JP | 201068520 A | 3/2010 |
| JP | 201784645 A | 5/2017 |
| WO | 2004038340 A1 | 5/2004 |
| WO | 2015094248 A1 | 6/2015 |

* cited by examiner

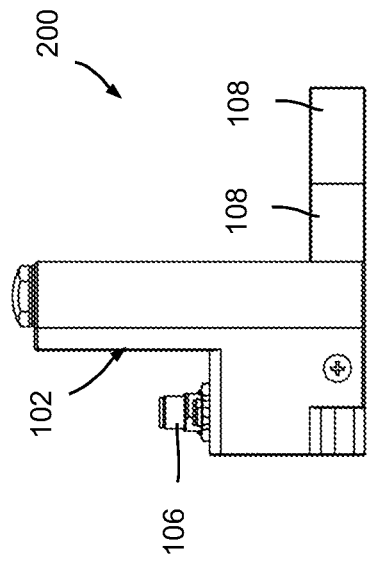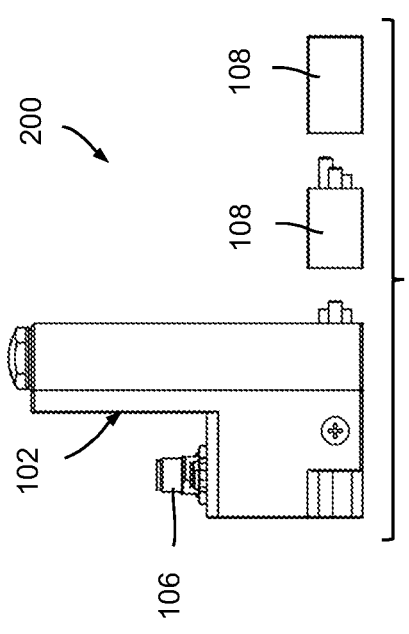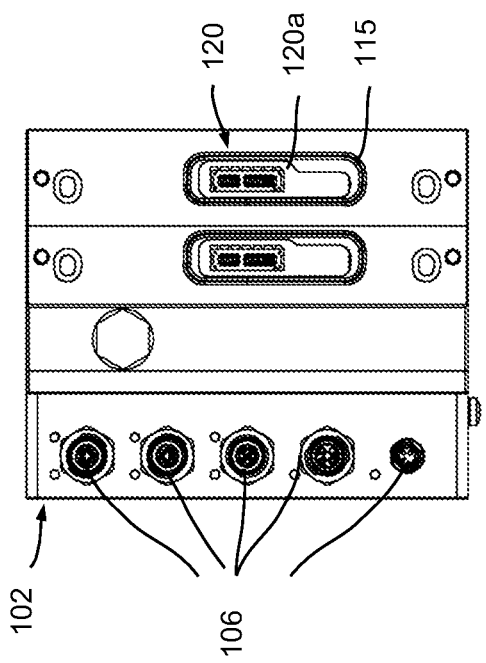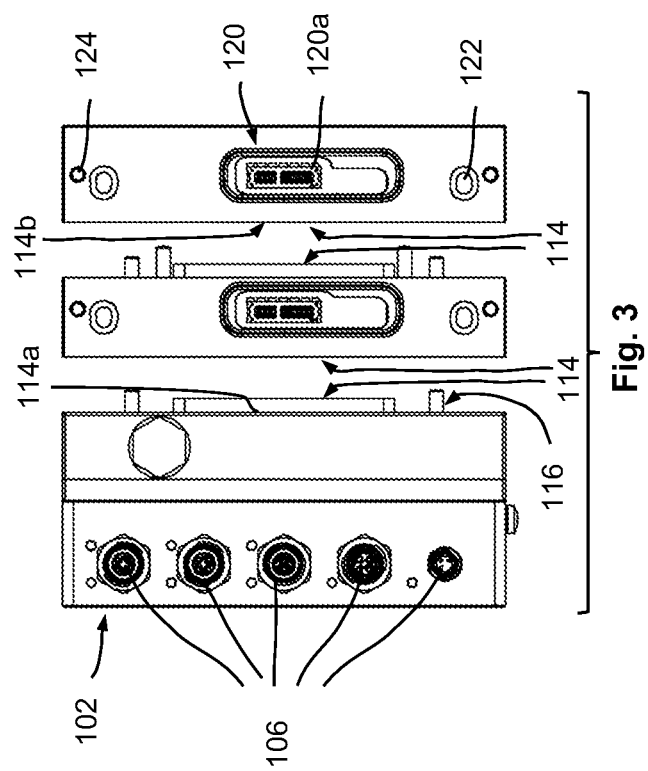

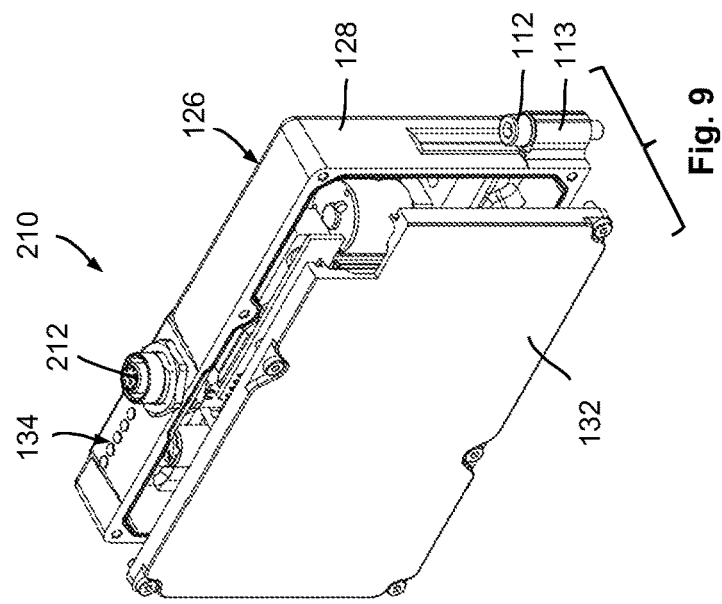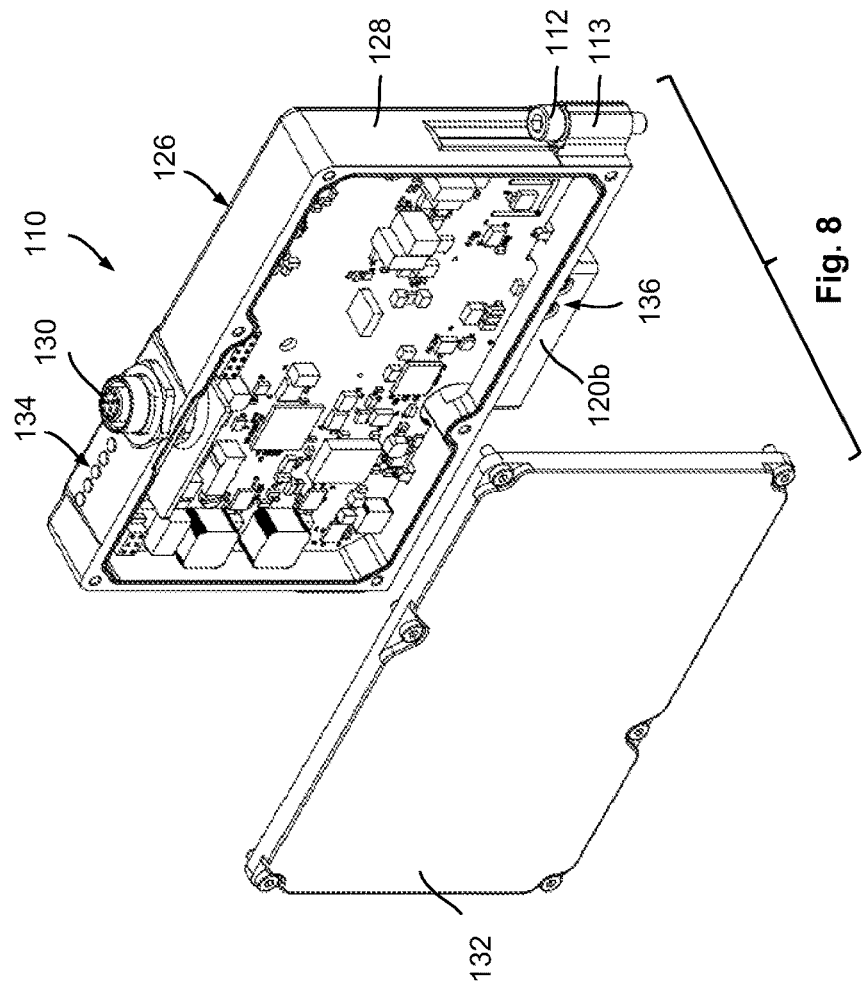

MODULAR METROLOGICAL DEVICE, IN PARTICULAR FOR A MULTI-TRACK WEIGHING MACHINE

TECHNICAL FIELD OF THE INVENTION

The invention relates to modular metrological devices, in particular for multi-track weighing machines.

BACKGROUND OF THE INVENTION

Multi-track weighing machines of known design often have weighing cells arranged next to one another and/or one behind the other, wherein each weighing cell is designed to detect the weight of products. Each weighing cell may provide measured values, whether in analogue or digital form, to a respective associated control unit. The control unit can control the associated weighing cell in such a way that one or more weight values of a product are recorded at predetermined times and, after their transmission to the relevant control unit, are evaluated by the latter, for example averaged, and, if necessary, transmitted to a higher-level control unit.

It is known to design the control units in a modular manner and to provide them on a common, continuous base plate in which an electrical bus with a corresponding number of slots is formed.

However, this common, continuous base plate design has the disadvantage that the base plate with the electrical bus provided in it for contacting the individual modular control units determines the number of slots from the start. Once all the slots are occupied, no further extension is possible. In addition, the size of such a complete control unit is determined from the start, regardless of how many slots are actually occupied with control units.

SUMMARY OF THE INVENTION

It is an object of the invention to provide modular metrological devices, in particular weighing devices, in particular for a multi-track weighing machine, that overcome the above-noted problems and others associated with prior devices.

A modular weighing device according to a first aspect of the invention is constructed from a basic base module and a plurality of adjacent extension modules connected to form a stack. Each extension module comprises an add-on base module and a connection module connected to the add-on base module. Adjacent extension modules are electrically and mechanically connected to one another to form the stack of extension modules. The basic base module is electrically and mechanically connected to one of the outer extension modules of the stack of extension modules (i.e. extension modules located at one end of the stack). The mechanical and electrical connection of the extension modules to one another and the mechanical and electrical connection of the basic base module to the adjacent extension module are made by an electrical and mechanical connection of the respective adjacent add-on base modules to one another and the electrical and mechanical connection of the basic base module to the add-on base module of the adjacent extension module. In some embodiments the basic base module may be connected to a plurality of stacks of extension modules, for example in linear form on two opposite sides or in a star-shaped variant, wherein the basic base module is provided as a kind of hub or central point of the star. However, in other embodiments the plurality of stacks of extension modules are provided at corresponding arbitrarily positioned mechanical and electrical connection terminals of the basic base module.

For example, it is possible to arrange two or more stacks of extension modules on one side of the basic base module in such a way that the connection modules of the stacks are provided in alignment with one another (in the direction perpendicular to the direction in which the extension can occur). In this way, narrow, parallel weighing tracks can be realized.

The same electrical (at least one) bus (or also a corresponding plurality of buses) can be used for all stacks of extension modules. Alternatively, a separate electrical bus or a plurality of separately assigned (own) buses can also be used for each of the stacks.

Embodiments of the invention allow the number of extension modules in each stack to be varied as desired. This is because only one additional add-on base module has to be added and a connection module has to be connected to the added-on base module. At the same time, this has the advantage that the size of the assembly is only dependent on the number of extension modules present. A modular weighing device constructed in this way only requires the installation space that is absolutely necessary for the number of extension modules present. The extension modules can have a different width when viewed in the longitudinal direction of the stack of extension modules (in which an extension is possible). For example, connection modules designed as weighing cells can have different widths in order to realize a multi-track weighing machine with tracks of different widths. The width of the associated add-on base modules is at least as large as the width of the relevant connection modules.

According to some embodiments, the basic base module and the add-on base module of the adjacent extension module and the add-on base modules of respective adjacent extension modules are each electrically connected by means of at least one electrical bus connection, wherein the electrical connection is designed in each case as a plug connection, which simultaneously effects a mechanical connection. This arrangement allows extremely simple assembly. Of course, in addition to the plug connection between two adjacent add-on base modules or between the basic base module and its adjacent add-on base module, a further mechanical connection, for example a snap-in connection or a screw connection, can also be provided.

The respective adjacent add-on base modules and the basic base module and the adjacent base module can have complementary plugs on mutually facing end faces to form the plug connection, wherein the plugs can preferably be designed in such a way that the mutually facing end faces touch one another when connected or only a small gap remains, which is preferably less than 1 mm, most preferably less than 0.5 mm. The add-on base modules can be identical in size and design. For example, the add-on base modules can each be cuboid and elongated, wherein the plugs are provided on the long end faces. The interconnected add-on base modules thus form a modular base plate. The plug connections can also be designed by the provision of sealing features in such a way that a dustproof and watertight connection of the electrical connections between the respective adjacent components is provided.

According to further embodiments, each add-on base module is electrically and mechanically connected to the associated connection module on an upper side by means of an electrical plug connection. The plug connection can be designed by the provision of sealing features in such a way that a dustproof and watertight connection of the electrical connections between the add-on base module and the associated connection module is provided. The connection modules can be easily and quickly disconnected from the relevant add-on base module and exchanged.

The substantially dustproof and watertight connection can be made both when connecting the add-on base modules to one another or to the basic base module and when connecting the add-on base modules to the connection modules in such a way that a sealing feature is provided on at least one of the complementary plugs (or sockets) of the respective plug connection, which creates the desired dustproof and watertight state when the relevant modules are assembled. The term "watertight and dustproof" in the context of this description is to be understood as not necessarily guaranteeing a leak-tight connection under all circumstances, but rather as guaranteeing a leak-tightness that is sufficient for the respective intended use, in particular according to an industrial standard such as DIN EN 60529. According to this standard, a leak-tightness in the classes IP64 to IP69 in particular can be guaranteed, wherein classes 64 and 65 will be applied in many cases.

The electrical plug connection on the side of the add-on base module in some embodiments, i.e. the electrical plug which is provided on the add-on base module, can preferably provide all bus connections of the at least one bus connection for the relevant connection module, i.e. all electrical buses which are looped through from the basic base module via each of the add-on base modules to the last add-on base module of the stack of extension modules. This makes it possible to design the connection modules in such a way that they use all or only selected bus connections. In practice, however, in most cases a single bus connection will be satisfactory, i.e. a single type of electrical bus, looped through from the basic base module to the last add-on base module.

According to some embodiments, each connection module can be connected to the respective add-on base module by an additional mechanical connection, preferably by means of a screw or snap-in connection. The result of this is that the connection modules are mounted more securely, even with respect to oscillations and vibrations, on the respective add-on base module. In the case of connection modules designed as weighing cells, as a result of this, the weighing cell, in particular the load receptor, can also be precisely positioned and fixed.

In some embodiments, all add-on base modules are identical in design. However, in these embodiments, the last add-on base module, which is located on the side of the stack of extension modules not connected to the basic base module, also has the at least one bus connection which can be connected to a further add-on base module. If the entire modular weighing device is to be designed to be dustproof and substantially watertight, it would be necessary here to seal the bus connection in a correspondingly leak-tight way. This, can be done with an appropriate cover or cap.

According to some embodiments, all add-on base modules are identical in design, with the exception of the last add-on base module, which is arranged at the end of the stack of extension modules that is not connected to the basic base module. Only the last add-on base module does not have a plug on the end face that is not connected to another add-on base module. With these embodiments, there are therefore two different types of add-on base modules, namely a first type (middle type), which has corresponding bus connections on both end faces, and a second type (end type), which only has the at least one bus connection on the side that is adjacent to the penultimate add-on base module. No measures are required to seal a bus connection or plug in these implementations. However, in the case of extension with additional extension modules, the last add-on base module, which is designed as an end type, must be removed before further add-on base modules designed as a middle type can be inserted.

Each add-on base module in some embodiments can have a mechanical connection means (connector) for mechanically connecting the add-on base module to a carrier, for example a housing. This allows the entire modular weighing device to be securely connected to the carrier in a simple way. It is not absolutely necessary (but of course possible in principle) for each of the add-on base modules to be connected to the carrier. Rather, it is sufficient to make such a connection at some of the modules, for example at the basic base module, which can also have a corresponding connection means, and the last add-on base module. In the case of larger stacks of extension modules, a connection to the carrier can also be made at one or more intermediate add-on base modules.

The connection modules may be designed as electronic evaluation and/or control units for weighing components, in particular weighing cells, force sensors or acceleration sensors, wherein the connection modules preferably have electrical connections designed as plug connections for the electrical connection of the associated weighing components. It is also possible to provide different types of connection modules on the (preferably identical in design) add-on base modules.

Furthermore, one, several or all of the connection modules can be designed as weighing cells. The weighing cells may already partially or completely contain their associated electronic components. Thus, a modular weighing device is created which forms the basic unit of a multi-track weighing machine. The weighing cells designed as connection modules can be designed in such a way that they only have an electrical connection, in particular a plug connection, on their underside for connection to the respective add-on base module. Such weighing cells may have, for example on the upper side, a feed-through for the load receptor, which is used to apply the weight to be detected onto the weighing cell. However, such weighing cells can also be designed in such a way that, in addition to the load receptor, an electrical connection is provided, in particular in the form of a plug, which is used to connect to a further component, for example a conveyor belt, which is located on the load receptor as a preload. The electrical connection may also be integrated in the load receptor.

It is also possible within the scope of the present invention to design the weighing cells, which are designed as a connection module, to each be integrated with the relevant add-on base module. In this case, the electrical and mechanical connection between the add-on base module and the connection module is dispensed with. The weighing cells can contain all the electronics required for recording and processing the measured values for the weight to be recorded. The measured values can then be transmitted to the basic base module via the at least one electrical bus for further processing or forwarding to a higher-level control unit.

According to some embodiments, the connection modules can have setting means, in particular switches, for setting a bus address of the respective connection module, wherein the setting means are preferably provided at the periphery of a collar of a plug which engages in a cooperating plug of the respective add-on base module. In this way, the setting means or switches do not have to be additionally protected from environmental influences, in particular dust and moisture. This applies in particular if the relevant plug connection is sealing in design.

The basic base module, the add-on base modules and the connection modules may each have a sealed housing, in particular a substantially dustproof and watertight housing. In this context, a "sealed housing" is also understood to mean a housing which only has leaking points (if non-sealed electrical plugs are used) at electrical plugs which are routed to the outside. In this case, complete leak-tightness can be achieved by making the relevant electrical plug connection together with the complementary electrical plug of an adjacent additional module. The cooperating plugs may already be sufficiently leak-tight when plugged in. In addition, the mutually facing end faces of the adjacent modules can lie directly against one another and/or a sealing feature, such as a seal surrounding the plug connection, so that the housings of the adjacent modules are leak-tight in the assembled state. This seal can be provided on the surface of one or both of the mutually facing housing walls and have such elasticity that the desired leak-tightness is created when the plug connection is made. An increase in the contact pressure between the mutually facing end faces of the relevant housings can be achieved by additionally creating a mechanical connection between the respective adjacent modules or their housings, for example by screwing.

The housing, in particular the housing for a connection module or an extension module designed as a weighing cell (in which the connection module designed as a weighing cell is integrated with the add-on base module), can be designed in two parts to effect the desired sealing. A first housing part in the form of a container-like or pot-shaped part, which includes a base with an integrated side wall, can be connected to a second housing part in the form of a flat cover, for example, wherein a sealed connection is formed between the cover and the side wall. Such a housing can also include two container-like halves, wherein the side walls integrated with the base or cover part are connected in a leak-tight way.

The housing can also have optical status display devices, for example LEDs, wherein the status display is visible from the outside (i.e. when the housing is sealed). This applies in particular to housings for connection modules, regardless of whether these are designed as pure electronics modules or as weighing cells, and to integrated extension modules designed as weighing cells.

According to further embodiments, the basic base module can have or provide a power supply for the extension modules, in particular the connection modules (e.g. by looping a power supply line through the basic add-on module). The power supply can thereby run via predetermined lines or connections of the electrical bus or bus connections.

A basic base module within the scope of the present invention can also have a control unit which is designed to control the connection modules and/or the metrological, in particular weighing, components connected to them and/or to record and/or forward and/or evaluate the signals and/or measured values supplied by the connection modules. In this way, for example, a synchronization of the measured value acquisition of the connection modules can take place, either controlled by the basic base module or, in the case of signals that are correspondingly looped through or forwarded, by a higher-level control unit.

The basic base module in some implementations can have electrical connections for connection to a higher-level control unit, wherein bidirectional communication between the basic base module and the higher-level control unit can, of course, also be enabled via this electrical connection.

These and other advantages and features of the invention will be apparent from the following description of representative embodiments, considered along with the accompanying drawings.

BRIEF DESCRIPTION OF THE DRAWINGS

FIG. 2 is a side view of a second embodiment with the modules shown in a non-assembled state and with the two extension modules each shown without a connection module.

FIG. 3 is a top view of the embodiment shown in FIG. 2.

FIG. 4 is a side view of the embodiment in FIG. 2 in an assembled state.

FIG. 5 is a top view of the embodiment in FIG. 2 in the assembled state.

FIG. 8 is a perspective view of a partially disassembled connection module which is designed as a pure electronics module.

FIG. 9 is a perspective view of a partially disassembled connection module which is designed as a weighing cell.

DESCRIPTION OF REPRESENTATIVE EMBODIMENTS

Figure 1:
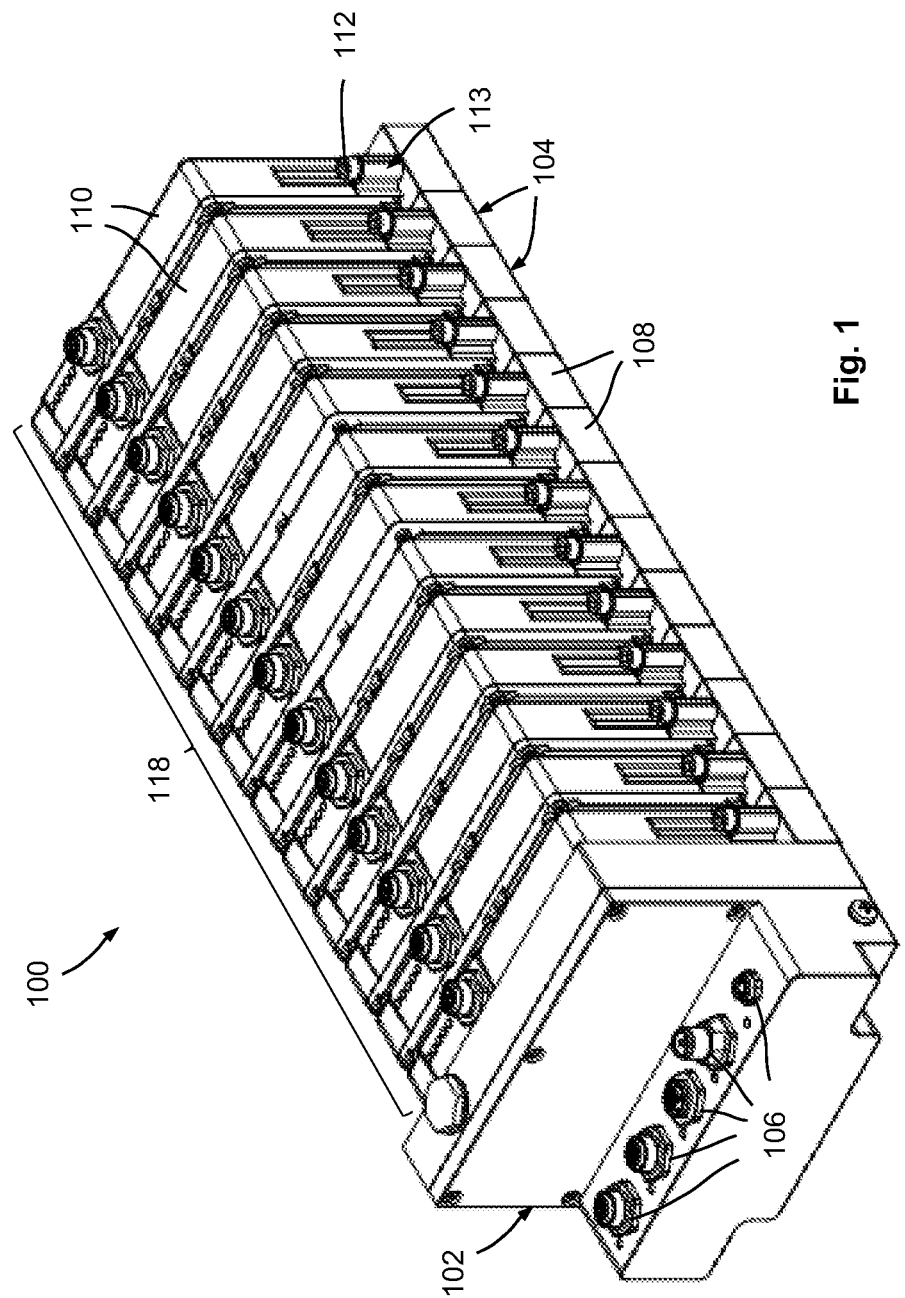
FIG. 1 is a perspective view of a first embodiment of a modular metrological, in particular weighing, device according to the invention.

The embodiment of a modular metrological device 100 shown in FIG. 1 represents a pure electronics unit for a weighing device in the form of a multi-track weighing machine. Device 100 includes a basic base module 102 and a total of thirteen extension modules 104 connected to the basic base module 102 in a disconnectable manner. The thirteen extension modules 104 comprises a stack 118 of such modules with a first extension module in the stack 118 connected to basic base module 118. The basic base module 102 may comprise, for example, a power supply for the extension modules 104 and an electrical bus unit (not visible) for controlling the communication between a central control device (not visible) also provided in the basic base module 102 and the extension modules 104 via at least one electrical bus. Furthermore, the basic base module 102 may comprise a plurality of connections 106, in particular connections for the electrical power supply and at least one connection for a communication link with a higher-level control unit (not shown). Furthermore, the connections 106 may also have one or more connections at which the one or more electrical buses (to which the extension modules (104) are connected) are merely looped through.

As can be seen from FIG. 1, the extension modules 104 each comprise an add-on base module 108 and a connection module 110. Each of the connection modules 110, which are substantially cuboid in shape, in the exemplary embodiment shown, is connected in a disconnectable manner mechanically and electrically to the associated add-on base module 108, which is also cuboid and elongated in shape. The mechanical connection can be made, for example, by means of two screws 112, wherein each of the screws 112 protrudes through a hole in a projection 113 provided on both narrow sides of a connection module 110 (see also FIGS. 4, 5, 6) and engages in a threaded hole in the relevant add-on base module. However, the mechanical connection can be made in any other way, for example by a clip or snap-in connection.

FIG. 2 shows an embodiment of a modular weighing device 200, which includes one basic base module 102 and two extension modules, of which only the add-on base module 108 is shown in each case. In the corresponding top view of this device 200 shown in FIG. 3, it can be seen that the central add-on base module 108 can be connected to the basic base module 102 in a disconnectable manner both via an electrical plug connection 114 (only the electrical plug on the side of the basic base module 102 can be seen) and via a mechanical connection 116, which in the embodiment shown comprises two pins on the side of the basic base module 102 and two corresponding holes on the side of the add-on base module 108 (not visible). In the exemplary embodiment shown, the mechanical connection between two adjacent add-on base modules 108 comprises four pins which each engage in a hole. The mechanical connection 116, which in the embodiment shown in FIG. 3 is designed as a plug connection, can be designed to generate mechanical retention forces by frictional engagement between the pins and the inner walls of the associated holes. However, the mechanical connection can also be made in any other way, for example by a clip or snap-in connection or a screw connection. In the variant shown, the electrical plug connection 114 is designed in such a way that the basic base module 102 and each add-on base module 108, to which a further add-on base module 108 is adjacent, has an electrical plug component 114a on its right-hand side in FIGS. 2 and 3, which engages in a complementary plug component 114b on the respective left-hand side of all add-on base modules 108. Here, the electrical plug connection 114 can also be designed in such a way that, in addition to a purely electrical connection, it also represents a mechanical plug connection with corresponding retention forces (in particular pull-out forces when separating adjacent modules).

The at least one electrical bus is looped through between the basic base module 102 and all add-on base modules 108 via the plug connection 114. For this purpose, a separate plug connection can also be used for each electrical bus. However, a single electrical bus is normally used for data transmission between the extension modules 104 and the basic base module. However, the basic base module 102 can be designed in such a way that different connections 106 are provided for data transmission between it and a higher-level control unit, wherein each connection may not only meet the specifications of a different (mechanical) plug standard, but may also meet the requirements of a different transmission standard or transmission protocol.

Furthermore, it can be seen in FIGS. 2 and 3 that the last of the add-on base modules 108 of a stack 118 of extension modules 104, i.e. the outermost add-on base module 108 of a stack 118 that is not connected to the basic base module 102, does not have another plug connection 114a. Such an add-on base module 108 can also be referred to as an end module. Providing an end module is optional. Instead, a "normal" add-on base module 108 can also be used, which offers the possibility of extension without any modification.

An advantage of an end module is that no open electrical interface remains or such an interface must be sealed by additional measures if there is a requirement to make the entire device 100, 200 insensitive to environmental influences, e.g. dustproof and/or watertight according to a specified industry standard (e.g. IP65).

For this purpose, the plug connection 114 and/or also generally the connection of the mutually facing sides of the add-on base modules 108 or the basic base module 102 can be designed to be correspondingly leak-tight. Sealing features can be provided for this purpose, such as sealing lips, seals provided between the plug components 114a, 114b, a circumferential seal (such as seal 115 described below) on the mutually facing end faces of the modules 108, 102 or similar. However, it may already be sufficient if the mutually facing end faces (housing walls) of the two modules 108 or 102 and 108 are designed to be complementary (in particular) to one another and are in direct contact with one another at least in a circumferential partial area. FIGS. 4 and 5 shows the modules 102 and 108 in an assembled or mounted state in which adjacent add-on base modules 108 are each in an add-on module operating condition and in which basic base module 102 is in a basic base module operating condition with the first add-on base module 108 of the two shown in this example. FIGS. 2 and 3 show the modules 102 and 108 separated from one another.

Figure 7:
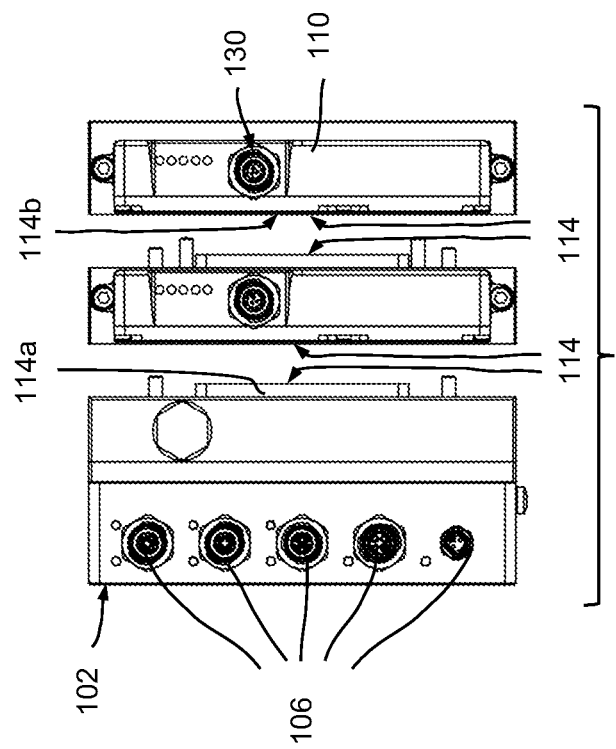
FIG. 7 is a top view of the embodiment in FIG. 2, wherein the extension modules are shown in full.
Figure 6:
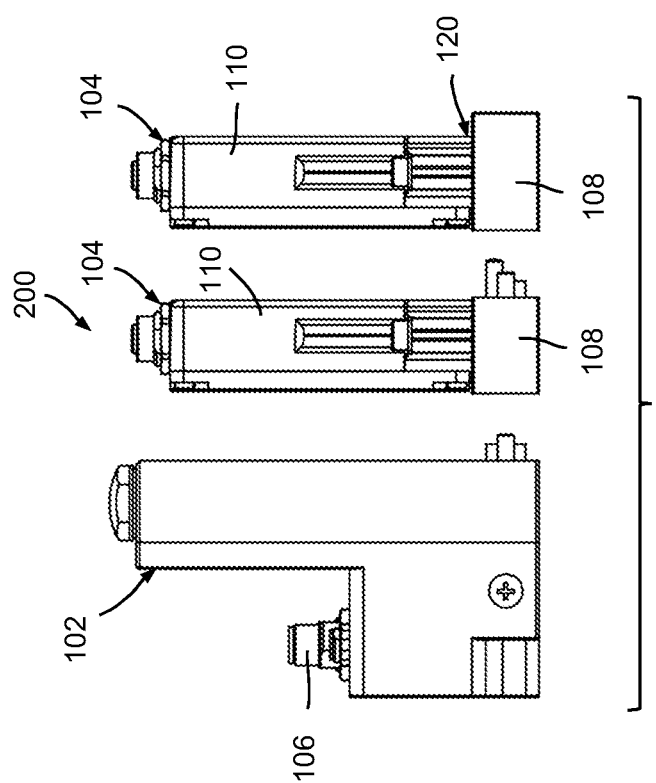
FIG. 6 is a side view of the embodiment in FIG. 2, wherein the extension modules are shown in full, i.e. with connection modules plugged into the add-on base modules.

In the top views according to FIG. 3 and FIG. 5, it can also be seen that each add-on base module 108 has an electrical plug component 120a of an electrical plug connection 120 on its upper side between the add-on base module 108 and the associated connection module 110. The assembled or mounted state of the modules 108 and 110 of the embodiment of a modular weighing device 200 with a basic base module 102 and two extension modules can be seen in FIGS. 6 and 7, wherein FIG. 6 shows a side view and FIG. 7 shows a top view. In FIGS. 6 and 7, the extension modules 104 and the basic base module are still shown in an unconnected state. The plug connection 120 is used to connect the relevant connection module 110 to the at least one electrical bus provided via the add-on base module.

The plug connection 120 between an add-on base module 108 and a connection module 110 can, like the plug connection 114, be designed in such a way that electrical contacts of the plug connection 120 are protected from environmental influences, in particular dust and moisture or water, and a specified industrial standard, for example IP65, is met. For this purpose, the plug connection 120 can include electrical plug components 120a, which are correspondingly sealed in the plugged-in state by means of suitable sealing features. Alternatively or additionally, a sealing feature of a suitable type, for example a circumferential seal 115 made of a sealing elastic material, can of course also be provided on the mutually facing end faces of the add-on base module 108 (i.e. in the exemplary embodiment, its upper side) and the connection module 110 (i.e. in the exemplary embodiment shown, its underside). However, it may already be sufficient if the mutually facing end faces of the two modules 108, 110 are designed to be complementary (in particular) to one another and are in direct contact with one another at least in a circumferential partial area.

The top views according to FIG. 3 and FIG. 5 show holes 122 (labeled in FIG. 3) in the lateral areas of the add-on base modules 108, which are used for attaching the add-on base modules 108 to a carrier (not shown), for example to a housing of a scale or to a machine frame, by means of a screw connection. For this purpose, screws (not shown) can pass through the holes 122 and engage in corresponding threaded holes in the carrier.

Furthermore, the top views according to FIG. 3 and FIG. 5 show threaded holes 124 in which the screws 112, which protrude through the lateral projections 113 of the connection modules 110 shown in the example of FIG. 1, engage to fix the connection modules 110 on the relevant add-on base module 108.

FIG. 8 shows a connection module 110, which is designed as a pure electronics module. The connection module 110 has a housing 126 which is made of two parts. The electronics arranged on a printed circuit board are provided with a pot-shape design part 128, which has a substantially flat base and a circumferential side wall that runs substantially perpendicular to it. The electronics can be attached in the pot-shaped housing part 128 in the usual way, for example by means of a screw connection or a clip connection. The electronics have electrical connections to an electrical plug component 120b of the electrical plug connection 120 between the connection module 110 and the associated add-on base module 108. The actual plug can also be surrounded by a dome or flange, which is integrally formed with or connected to the housing in a leak-tight way. For the purpose of this description, such a dome or flange is considered to be covered by the term "plug". Furthermore, the electronics have electrical connections that are connected to an electrical plug 130. The plug 130 or the relevant connections are used to connect another component, for example a weighing cell, to the connection module 110. The pot-shaped housing part 128 is sealed by means of a substantially flat housing cover 132 in the exemplary embodiment shown. A seal can be provided between the housing cover 132 and the end face of the side wall of the pot-shaped housing part 128 to ensure adequate protection of the electronics from environmental influences, in particular dust and moisture or water. The housing cover 132 may be attached in a disconnectable manner to the pot-shaped housing part 128, for example by means of a screw connection.

An optical display 134, for example in the form of status LEDs, can be provided in a housing wall of the housing 126. In the exemplary embodiment shown, a row of status LEDs is provided in the upper side wall (when assembled) of the pot-shaped housing part 128. These LEDs can indicate, for example, readiness for communication with the basic base module, an existing power supply, the existing connection of another component, for example a weighing cell, to the electrical plug 130 and similar.

The plug component 120b can furthermore be designed (for each type of connection module) so that an address switch 136 is integrated on its circumferential wall, which engages in the complementarily designed plug component 120a of an add-on base module. This can have one or more mechanical switching means, e.g. setting wheels, which combined with associated addressing electronics and/or software define a bus address of the respective connection module 110. Through the provision of the switching means on the plug circumference (i.e. on the circumference of a correspondingly designed plug or on the circumference of a dome or flange of the housing), they are easily accessible when the connection module 110 and add-on base module 108 are disassembled and, when assembled, are protected from unintentional actuation and environmental influences.

FIG. 9 shows a connection module 210 which is designed as a complete weighing cell. The weighing cell can operate according to the principle of electromagnetic force compensation and be equipped with a monobloc mechanism. The weighing cell can, of course, also work according to any other principle, for example by means of strain gauges or according to the vibrating side principle, and be correspondingly designed. The weighing cell can contain all the electronics (or parts or components thereof) required for recording and, where applicable, processing the measured values for the weight applied to the weighing cell via the load receptor 212. In addition to the load receptor 212, one or more electrical connections can be also routed in the connection module 210 via the same connection to the relevant further component, for example a conveyor belt with drive for a multi-track weighing machine The housing 126 of the connection module 210 designed as a weighing cell can be designed in the same way as described above in connection with the connection module 110 designed as a pure electronics module. This also applies to the provision of an optical display 134 for the status of the weighing cell or the connection module 210.

Furthermore, the basic base module 102 and each add-on base module 108 can also have housings that are designed in an analogous manner.

The assembly of the individual modules of a modular device 100 according to the invention can be flexible. For example, the connection modules 110, 210 can first be connected to the respective add-on base modules to form the extension modules 104 and then the pre-assembled extension modules 104 can be connected to form a stack of connection modules. Subsequently, the basic base module 102 can be arranged at the desired side of the stack of extension modules and connected to it. Of course, the first extension module 104 can also be initially connected to the basic base module 102, in order to then connect one extension module 104 after the other to the respective previously assembled extension module 104. In this case, as explained above, the last (outermost) extension module 104 can have an add-on base module 108, which is designed as an end module.

If the modular weighing device 100 is to be attached to a carrier, all of the add-on base modules can also first be connected to the basic base module 102. This unit can then be attached to the carrier using screws that protrude through the holes 122 of the add-on modules. Subsequently, the connection modules 110, 210 can then be plugged into the add-on base modules 108 and, if necessary, fixed to them with the screws 112.

It should be noted that, according to some implementations, an overall system can be created which comprises a universal basic base module 102 with a desired number of extension modules designed in a desired manner. The extension modules 104 do not necessarily have to have similar or identical connection modules 110, 210. Rather, it is possible to provide any number of different types of connection modules 110, 210 that can be connected to or plugged into the add-on base modules 108. It is possible to select any slot or an assignable add-on base module for each connection module 110, 210. This makes it possible to provide a desired type of connection module 110, 210 at any position in a stack of extension modules 104. Add-on base modules 108 of different widths with correspondingly wide (or even different width) connection modules 110, 210 are also possible, e.g. for weighing cells with different load-carrying capacities and correspondingly different width monobloc mechanisms.

If an already existing modular weighing device 100 is to be extended, only one further extension module 104 must be added. If the add-on base module 108 of the outermost extension module 104 of a stack of extension modules is designed as an end module, the stack of extension modules must first be disconnected, i.e. at any position an add-on base module 108 must be disconnected from the adjacent module. The additional extension module 104 (or initially the additional add-on base module 108) can then be inserted at this point of disconnection.

The invention also offers the option to exchange connection modules 110, 210 extremely simply. All that is required for this is to disconnect the relevant connection between the connection module and the associated add-on base module 108 and to replace the connection module 110, 210 with a connection module of the same or of a different type.

In some implementations, the add-on base modules 108 may be designed as purely passive electromechanical units, i.e. these modules comprise in particular only passive electrical components, such as electrical lines, branches of electrical lines, electrical plugs and, where appropriate, passive electrical components such as capacitors, resistors and similar. The probability of an electrical defect is thus very low, in particular because (active) signal processing in the add-on base modules 108 is dispensed with. An electrical defect or mechanical defect (in particular in the case of a connection module designed as a weighing cell) will therefore most likely only be present in the connection module 110, 210. In such a case, a connection module can be replaced even more quickly and easily than if the associated add-on base module 108 also had to be removed from the stack of extension modules 104.

In other implementations the extension modules may be designed in an integrated way, i.e. as a unit, and not to realize them as two separate units in the form of an add-on base module and a connection module connected to it in a disconnectable manner. Such a solution may be particularly suitable in the case of extension modules that are designed as weighing cells.

In some embodiments of the invention the basic base module may be designed in two parts, comprising a part analogous to an add-on base module of the type described above and a basic connection module which can be or is connected to it and which realizes the functionality of a basic base module. In terms of construction, the basic connection module can be designed in the same way as the connection modules described above, in particular with regard to the mechanical and electrical connections. This allows the position of the basic base module within the entire modular metrological device to be freely selected in accordance with the requirements of the respective application.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). Rather than using an ordinal term to distinguish between commonly named elements, a particular one of a number of elements may be called out in the following claims as a "respective one" of the elements and thereafter referred to as "that respective one" of the elements.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

LIST OF REFERENCE NUMERALS

100 Modular weighing device
102 Basic base module
104 Extension module
106 Connection
108 Add-on base module
110 Connection module
112 Screws
113 Projection
114 Electrical plug connection
114a Electrical plug
114b Electrical plug
115 Circumferential seal
116 Mechanical connection
118 Stack of extension modules
120 Electrical plug connection
120a Electrical plug
120b Electrical plug
122 Hole
124 Threaded hole
126 Housing
128 Pot-shaped housing part
130 Electrical plug
132 Housing cover
134 Optical display
136 Address switch
200 Modular weighing device
210 Connection module (weighing cell)
212 Load receptor

The invention claimed is:

1. A modular metrological device for a weighing machine, the modular metrological device including:
   (a) a basic base module having a sealed dustproof and watertight basic base module housing;
   (b) a plurality of extension modules, each extension module including a respective add-on base module and a respective connection module which is mechanically and electrically connected by a respective disconnectable mechanical and electrical connection to the respective add-on base module, each respective add-on base module having a sealed dustproof and watertight add-on base housing and each respective connection module having a sealed dustproof and watertight connection module housing;

(c) wherein the extension modules are arranged adjacent to one another to form a stack of extension modules with the respective add-on base module of each extension module being mechanically and electrically connected by a respective disconnectable mechanical and electrical connection to the respective add-on base module of at least one adjacent extension module in the stack of extension modules;

(d) wherein the basic base module is mechanically and electrically connected by a respective disconnectable mechanical and electrical connection to the add-on base module of a first extension module, the first extension module comprising the extension module located at a first end of the stack;

(e) wherein forming the respective disconnectable mechanical and electrical connection between the respective add-on base modules of adjacent extension modules places those adjacent extension modules in a respective add-on module operating condition and forming the disconnectable mechanical and electrical connection of the basic base module to the add-on base module of the first extension module places the basic base module in a basic base module operating condition with the first extension module; and (f) wherein each respective connection module comprises a weighing component electronic evaluation unit, a weighing component electronic control unit, or a weighing cell.

2. The modular metrological device of claim 1 wherein the disconnectable mechanical and electrical connection of the basic base module to add-on base module of the first extension module and the disconnectable mechanical and electrical connection between the respective add-on base modules of adjacent extension modules each includes a respective plug connection to an electrical bus.

3. The modular metrological device of claim 2 wherein each respective plug connection to the electrical bus includes a mechanical connection.

4. The modular metrological device of claim 3 wherein all add-on base modules are identical in design.

5. The modular metrological device of claim 3 wherein the add-on base module for the extension module at an end of the stack of extension modules opposite to the first extension module includes a stack end face forming an end of the stack of extension modules, the stack end face having no connection plug component.

6. The modular metrological device of claim 2 wherein each respective plug connection to the electrical bus includes a first electrical plug component and a second electrical plug component which is complementary to the first electrical plug component and wherein for each respective plug connection the respective first electrical plug component is located on a housing wall in the modular metrological device facing another housing wall in the modular metrological device on which is located the respective second electrical plug component.

7. The modular metrological device of claim 6 wherein for each respective plug connection the facing housing walls are separated by a gap of less than 1 mm.

8. The modular metrological device of claim 6 wherein for each respective plug connection a sealing feature is provided on a surface of the housing wall on which the respective first or second electrical plug component is located, the sealing feature surrounding the respective first or second electrical plug component so as to provide a dustproof and watertight seal for the respective plug connection.

9. The modular metrological device of claim 8 wherein for at least one of the plug connections a screw connection is provided for bringing the facing housing walls together to produce a desired contact pressure on the sealing feature.

10. The modular metrological device of claim 2 wherein in each extension module the add-on base module is electrically connected to the respective connection module of that extension module by an electrical plug connection on an upper side of the respective add-on base module.

11. The modular metrological device of claim 10 wherein in each extension module the electrical plug connection on the upper side of the respective add-on base module additionally provides a first mechanical connection between the respective add-on base module and the respective connection module of that extension module.

12. The modular metrological device of claim 11 wherein in each extension module the respective connection module is connected to the respective add-on base module of that extension module by an additional mechanical connection separate from the first mechanical connection.

13. The modular metrological device of claim 10 wherein each extension module the electrical plug connection on the upper side of the respective add-on base module connects the respective connection module to the electrical bus.

14. The modular metrological device of claim 1 wherein each add-on base module further includes a mechanical connection feature for mechanically connecting the respective add-on base module to a carrier.

15. The modular metrological device of claim 1 wherein the connection module of one of the extension modules comprises an electronic component connection module that includes an electronic evaluation or control unit for a weighing component comprising a weighing cell, force sensor, or acceleration sensor and wherein the electronic component connection module includes an electrical plug component for providing an electrical connection for the weighing component.

16. The modular metrological device claim 1 wherein in each extension module, the respective connection module includes a switch arrangement for setting a bus address of the respective connection module, the switch arrangement located at a periphery of a collar of a plug component of the respective connection module which engages a cooperating plug component of the respective add-on base module.

17. The modular metrological device of claim 1 wherein the basic base module includes a power supply for the extension modules included in the stack of extension modules.

18. The modular metrological device of claim 1 wherein the basic base module comprises a control unit operable for (i) controlling the connection modules or weighing components connected to them or (ii) recording, evaluating, or forwarding signals supplied by the connection modules.

19. The modular metrological device of claim 1 wherein the basic base module includes an electrical connection for operatively connecting the basic base module to a higher-level control unit.

* * * * *